United States Patent
Pinarbasi et al.

(10) Patent No.: US 7,228,618 B2
(45) Date of Patent: Jun. 12, 2007

(54) METHOD FOR FABRICATING A MAGNETIC HEAD

(75) Inventors: Mustafa Pinarbasi, Morgan Hill, CA (US); Patrick Rush Webb, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 89 days.

(21) Appl. No.: 10/970,632

(22) Filed: Oct. 20, 2004

(65) Prior Publication Data

US 2005/0055823 A1 Mar. 17, 2005

Related U.S. Application Data

(62) Division of application No. 10/084,845, filed on Feb. 26, 2002, now Pat. No. 7,149,062.

(51) Int. Cl.
*G11B 5/127* (2006.01)
*H04R 31/00* (2006.01)

(52) U.S. Cl. .............................. 29/603.14; 29/603.13; 29/603.27; 360/324; 360/325; 360/327

(58) Field of Classification Search ............. 29/603.07, 29/603.13–603.16, 603.27; 360/324–327
See application file for complete search history.

(56) References Cited

U.S. PATENT DOCUMENTS

| | | | |
|---|---|---|---|
| 5,508,866 A | 4/1996 | Gill et al. | 360/113 |
| 5,784,225 A | 7/1998 | Saito et al. | 360/113 |
| 5,811,155 A | 9/1998 | Pinarbasi | 427/131 |
| 5,869,963 A | 2/1999 | Saito et al. | 324/252 |
| 5,959,810 A | 9/1999 | Kakihara et al. | 360/113 |
| 6,046,892 A | 4/2000 | Aoshima et al. | 360/113 |
| 6,052,262 A | 4/2000 | Kamiguchi et al. | 360/113 |
| 6,118,624 A | 9/2000 | Fukuzawa et al. | 360/113 |
| 6,144,534 A | 11/2000 | Xue et al. | 360/327.31 |
| 6,153,062 A | 11/2000 | Saito et al. | |
| 6,154,345 A | 11/2000 | Ishiwata et al. | 360/317 |
| 6,159,593 A | 12/2000 | Iwasaki et al. | 428/332 |
| 6,183,859 B1 | 2/2001 | Chen et al. | |
| 6,317,299 B1 * | 11/2001 | Pinarbasi | 360/324.11 |
| 6,624,985 B1 * | 9/2003 | Freitag et al. | 360/324.1 |

OTHER PUBLICATIONS

"Effect Of Seed Layer On The Magnetoresistance Effect In a-CoNbZr-based Spin Valves"; Cho, H.S.; Ueda, F.; Hou, C.; Fujiwara, H.; MMM-Intermag Conference, 1998. Abstracts., The 7th Joint Jan. 6-9, 1998; pp. 60-60.*

* cited by examiner

*Primary Examiner*—Paul D. Kim
(74) *Attorney, Agent, or Firm*—Robert O. Guillot; Intellectual Property Law Offices

(57) ABSTRACT

A magnetic head having a spin valve sensor that is fabricated utilizing an $Al_2O_3$, NiMnO, Si seed layer upon which a PtMn spin valve sensor layer structure is subsequently fabricated. In the preferred embodiment, the Si layer has a thickness of approximately 20 Å and the PtMn layer has a thickness of approximately 120 Å. An alternative fabrication process of the Si layer includes the overdeposition of the layer to a first thickness of from 15 Å to 45 Å followed by the etching back of the seed layer of approximately 5 Å to approximately 15 Å to its desired final thickness of approximately 20 Å. The Si layer results in an improved crystal structure to the subsequently fabricated PtMn and other spin valve sensor layers, such that the fabricated spin valve is thinner and exhibits increased ΔR/R and reduced coercivity.

13 Claims, 2 Drawing Sheets

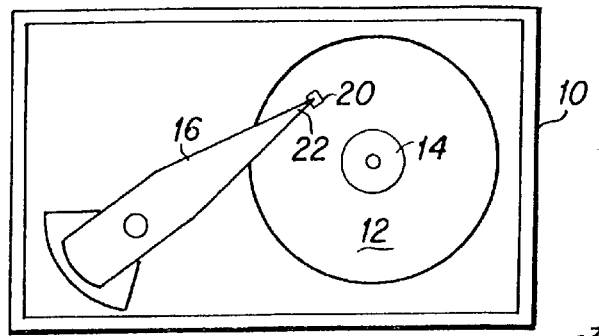
Fig.1
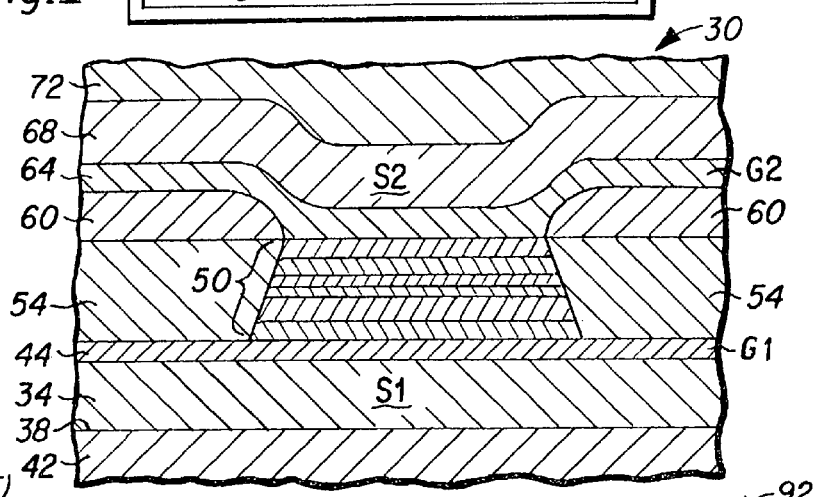
Fig.2 (PRIOR ART)
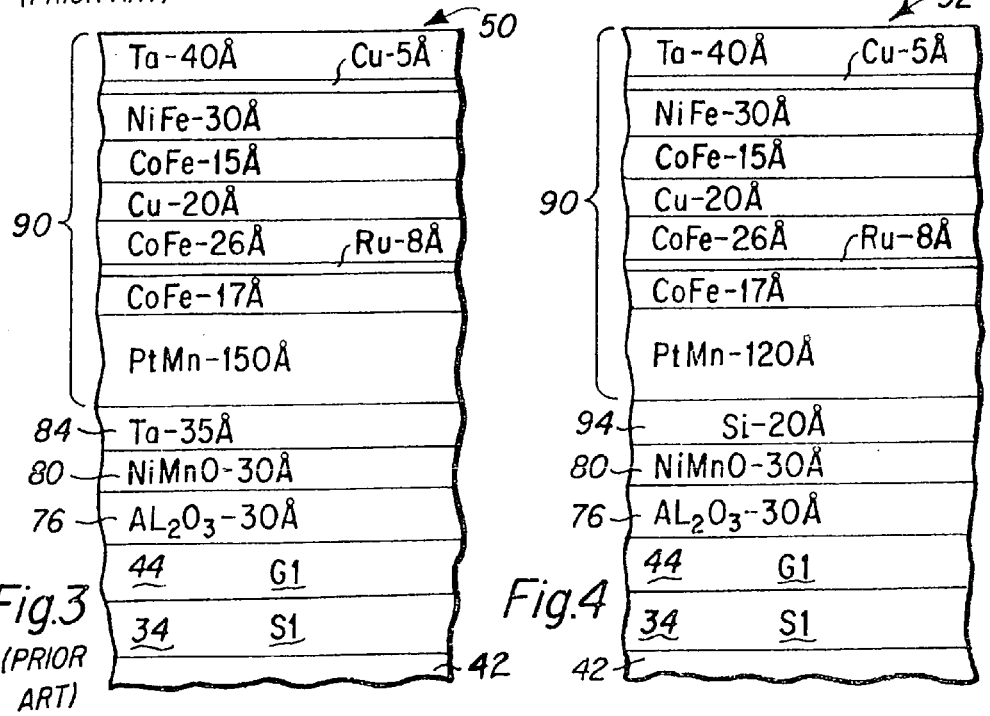
Fig.3 (PRIOR ART)
Fig.4

METHOD FOR FABRICATING A MAGNETIC HEAD

CROSS-REFERENCE TO RELATED APPLICATION

This application is a divisional application of copending U.S. patent application Ser. No. 10/084,845 filed Feb. 26, 2002, now U.S. Pat. No. 7,149,062.

BACKGROUND OF THE INVENTION

1. Field of the Invention

The present invention relates generally to spin valve sensors for magnetic heads, and more particularly to an improved Si seed layer for a PtMn spin valve sensor structure.

2. Description of the Prior Art

Increasing the areal data storage density of hard disk drives can be accomplished by reducing the written data track width, such that more tracks per inch (tpi) can be written on the disk, and/or by reducing the size of data bits, such that the number of bits per inch (bpi) on a data track can be increased. However, to read data from a disk with an increased bpi, it is also necessary to develop a sufficiently thin read gap within the read head of the magnetic head, such that unwanted magnetic field interference from adjacent data bits is substantially eliminated. Current state of the art magnetic heads have read head gaps of approximately 800 Å to 1,000 Å.

Magnetic heads for hard disk drives typically have a read head portion including a magnetoresistive (MR) spin valve sensor structure for reading data from the disk of the hard disk drive. As is well known to those skilled in the art, such MR sensor structures include a plurality of thin film layers disposed between two magnetic shields that define the read gap. The thin film layers have particular magnetic properties, and are sensitive to the magnetic field of the data bits on the hard disk. Thus, thinner layers disposed between the two magnetic shields will create a thinner read gap, which will allow the read head to detect the smaller data bits that a higher bpi data track contains. Additionally, where one or more of the sensor layers can be made thinner, the electrical insulation layers (G1 and G2) within the sensor can be made thicker, which reduces the incidence of electrical shorts through the G1 and G2 insulation layers.

The thin film layers of a typical MR spin valve sensor will include at least one antiferromagnetic layer, at least one pinned magnetic field layer, and at least one free magnetic field layer. When the magnetic field direction of the free magnetic field layer is parallel to the magnetic field direction of the pinned magnetic field layer, the electrical resistance R of the MR sensor is lowest. When reading data, a magnetic data bit of a hard disk will cause the magnetic field direction of the free magnetic field layer to change, whereupon the electrical resistance of the sensor increases. This change in resistance ($\Delta R$) affects the electrical current passing through the sensor, which is thus detected as a data signal. The parameter $\Delta R/R$ is useful in comparing magnetic head performance.

It is therefore desirable to develop MR sensors having a decreased thickness, while maintaining or even increasing the $\Delta R/R$ value. Where the metallic MR sensor layers are made thinner, there is less shunting of electrical current through these layers and away from the free magnetic layer. This leads to an increase in $\Delta R$ and improved magnetic head performance. Another parameter that is significant in spin valve sensor performance is the free layer coercivity, and generally, the lower the coercivity, the more stable the MR sensor will be. Thus a thinner sensor that maintains coercivity or even decreases coercivity is desirable.

Many different materials have been utilized in the prior art in attempts to increase $\Delta R/R$ and reduce the coercivity of the MR sensor. The present invention relates to a MR spin valve sensor that is fabricated utilizing a particular seed layer that replaces the prior art Ta sublayer with a Si sublayer. This allows the use of a thinner PtMn antiferromagnetic layer, thus leading to a thinner MR sensor, which allows for thicker G1 and/or G2 insulation layers while maintaining the same read gap thickness.

SUMMARY OF THE INVENTION

The spin valve sensor of the present invention is fabricated utilizing a three part $Al_2O_3$, NiMnO, Si seed layer upon which a PtMn antiferromagnetic layer is subsequently fabricated. The prior art seed layer is $Al_2O_3$, NiMnO, Ta. A preferred fabrication process of the seed layer includes the sequential deposition of the three sublayer parts of the seed layer in a vacuum chamber.

In the preferred embodiment, the Si seed sublayer is formed with a thickness in the range of from approximately 10 Å to approximately 40 Å, with a preferred thickness of approximately 20 Å, where the prior art Ta seed sublayer is fabricated with a thickness of approximately 35 Å. The use of the Si sublayer also allows a reduction in the thickness of the PtMn antiferromagnetic layer that is fabricated thereon, from a prior art value of approximately 150 Å to approximately 120 Å in the present invention. Thus the thickness of the MR sensor layers is reduced by approximately 15 Å in the seed sublayer, and by approximately 30 Å in the PtMn antiferromagnetic layer, such that the thickness of the MR sensor is reduced by approximately 45 Å; that is, the insulation thickness can be increased by approximately 45 Å. This increased insulation thickness reduces the risk of electrical shorts from the sensor to the shields.

The present invention may also include the overdeposition of the Si sublayer beyond its desired thickness, followed by the etching back of the Si sublayer to its desired thickness. Thereafter, a thinner PtMn spin valve sensor layer is fabricated upon the Si sublayer. Regarding the etched back Si sublayer embodiment, it is believed that the crystal structure of the surface of the etched back Si sublayer is altered by the etching process, and it results in an improved crystal structure to the subsequently fabricated PtMn layer and other sensor layers, such that the fabricated sensor exhibits increased $\Delta R/R$ and reduced coercivity.

In the etched back Si seed sublayer embodiment, the Si sublayer is deposited to a first thickness of from 15 Å to 45 Å and is etched back from approximately 5 Å to approximately 25 Å. In a particular embodiment, the Si sublayer is deposited to an initial thickness of approximately 30 Å and is etched back a thickness of approximately 10 Å to achieve a final thickness of approximately 20 Å. The use of etched back Si sublayer provides improved crystalline structure properties to the PtMn antiferromagnetic layer as well as layers fabricated thereon, such that improved $\Delta R/R$ and coercivity properties of the magnetic head of the present invention are obtained.

It is an advantage of the magnetic head of the present invention that it includes a magnetoresistive read head having a decreased sensor thickness.

It is another advantage of the magnetic head of the present invention that it includes a magnetoresistive sensor having a decreased sensor thickness, an increased ΔR/R and a reduced coercivity.

It is a further advantage of the magnetic head of the present invention that it includes a three part $Al_2O_3$, NiMnO, Si seed layer with a reduced thickness PtMn antiferromagnetic layer.

It is yet another advantage of the magnetic head of the present invention that it includes a magnetoresistive sensor including an Si seed sublayer portion having an improved upper surface crystalline structure that results in a sensor having a reduced sensor thickness and an increased ΔR/R and a reduced coercivity.

It is an advantage of the hard disk drive of the present invention that it includes a magnetic head of the present invention having a magnetoresistive spin valve sensor having a reduced sensor thickness.

It is another advantage of the hard disk drive of the present invention that it includes a magnetic head of the present invention that includes a magnetoresistive sensor having a reduced sensor thickness, an increased ΔR/R and a reduced coercivity.

It is a further advantage of the hard disk drive of the present invention that it includes a magnetic head of the present invention that includes a three part $Al_2O_3$, NiMnO, Si seed layer, with a reduced thickness PtMn, antiferromagnetic layer.

It is yet another advantage of the hard disk drive of the present invention that it includes a magnetic head of the present invention that includes a magnetoresistive sensor including an Si seed layer portion having an improved upper surface crystalline structure that results in a sensor having a reduced sensor thickness and an increased ΔR/R and a reduced coercivity.

It is an advantage of the method for fabricating a magnetic head of the present invention that it includes a MR sensor structure including an Si seed layer portion, such that a reduced sensor thickness and an increased ΔR/R and reduced coercivity results.

The foregoing and other objects, features, and advantages of the present invention will be apparent from the following detailed description of the preferred embodiments which make reference to the several figures of the drawing.

IN THE DRAWINGS

FIG. 1 is a top plan view generally depicting a hard disk drive that includes a magnetic head of the present invention;

FIG. 2 is a side cross-sectional view depicting a typical prior art spin valve read head portion of a magnetic head;

FIG. 3 is a side cross-sectional view depicting typical thin film layers that may be utilized in fabricating the prior art spin valve sensor structure depicted in FIG. 2;

FIG. 4 is a side cross-sectional view depicting a first embodiment of a spin valve sensor structure of the present invention;

DETAILED DESCRIPTION OF THE PREFERRED EMBODIMENTS

Figure 5:
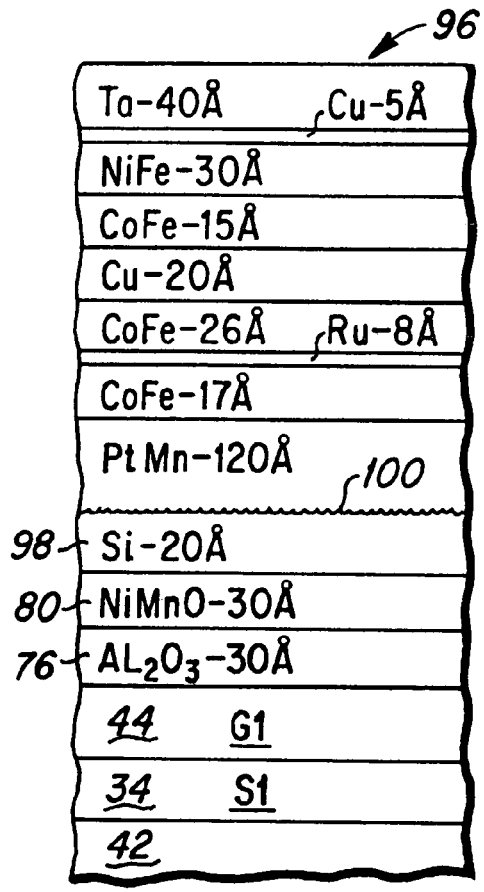
FIG. 5 is a side cross-sectional view depicting a second embodiment of a spin valve sensor structure of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

A typical prior art magnetic head is fabricated to include a read head portion for reading data from the hard disk and a write head portion for writing to a hard disk, and FIG. 2 is a generalized depiction of a prior art read head portion of a magnetic head which will serve as a starting point for the description of the novel read head features of the present invention that follow. As depicted in FIG. 2, the read head portion 30 includes a first magnetic shield layer (S1) 34 that is fabricated upon the surface 38 of a substrate base 42. A first insulation layer (G1) 44 is fabricated upon the S1 shield 34 and a plurality of read head sensor layers 50 are then fabricated upon the G1 layer 46. A detailed description of the sensor layers 50 is provided hereinbelow, and the novel sensor layers of the present invention are then discussed. Using photolithographic and etching techniques, portions of the sensor layers are removed such that the central portions 50 depicted in FIG. 2 remain. Thereafter, hard bias elements 54 are fabricated next to the sensor layers 50, electrical leads 60 are fabricated upon the hard bias elements 54, a second electrical insulation layer (G2) 64 is deposited across the device followed by the fabrication of a second magnetic shield (S2) 68, and a write head portion (generally indicated as 72) is subsequently fabricated to complete the magnetic head fabrication process.

The present invention is directed towards improvements in the specific layers that comprise the sensor element 50 of the read head, and a more detailed depiction of a typical prior art magnetoresistive (MR) spin valve sensor, such as may be utilized as sensor 50 in the prior art magnetic head of FIG. 2 is depicted in FIG. 3. As depicted in FIG. 3, a G1 electrical insulation layer 44 typically composed of $Al_2O_3$, is fabricated upon the S1 shield layer 34, that is typically composed of NiFe. This is followed by a three part seed layer composed of an $Al_2O_3$ sublayer 76, an NiMnO sublayer 80 and a Ta sublayer 84. Significantly, the composition of this type of three part seed layer is a focus of the present invention, as described in detail hereinbelow.

Following the seed layer deposition, a spin valve layer structure 90 is fabricated. As is seen in FIG. 3, the sequence of sensor layers in the prior art spin valve layer structure 90 is PtMn, CoFe, Ru, CoFe, Cu, CoFe, NiFe, Cu, Ta, and the typical thickness of the various layers is set forth in FIG. 3, and it is noteworthy that the prior art PtMn layer is particularly fabricated with a thickness of approximately 150 Å. As is well known to those skilled in the art, the PtMn layer acts as an antiferromagnetic layer, the CoFe, Ru, CoFe layers act as a pinned magnetic layer, the Cu layer acts as a spacer layer, the CoFe, NiFe layers act as the free magnetic layer, the Cu layer acts as a spin filter layer and the Ta layer acts as a cap layer.

Magnetoresistive spin valve sensors, such as are described herein, operate by detecting magnetic data bits written upon a hard disk through a change in electrical resistance within the spin valve sensor when the sensor is exposed to the magnetic field of the data bit. Specifically, the orientation of the free layer magnetic field is altered by the magnetic field of a data bit, and the change in the orientation of the free layer magnetic field creates a change in the electrical resistance of the sensor. The electrical resistance of the sensor is lowest when the free layer magnetic field is oriented parallel to the pinned layer magnetic field, and the resistance of the sensor increases when the free layer magnetic field is oriented other than parallel to the pinned layer magnetic field direction. Thus, an improved sensor (such as the present invention) will have a greater change in resistance when exposed to magnetic data bits, and this change in resistance is generally designated as $\Delta R$, where R is the sensor resistance when the free layer magnetic field is parallel to the pinned layer magnetic field, and $\Delta R$ is the change in resistance of the sensor when the free layer magnetic field is anti-parallel to the pinned layer magnetic field. The value $\Delta R/R$ basically is a representation of the percentage change in the sensor resistance, and it is utilized in comparing the qualities of spin valve sensors.

Another significant performance parameter for comparing sensor performance is the magnetic coercivity of the sensor, because the coercivity is a measure of the stability of the sensor, and the lower the coercivity of the sensor, the more stable it is. Therefore, it is a performance goal for the spin valve sensor of the present invention to have a higher $\Delta R/R$ and lower coercivity. As will appear from the following description the improved seed layer of the spin valve of the present invention results in the creation of spin valve sensors having such a higher $\Delta R/R$ and a reduced coercivity.

FIG. 4 is a side cross-sectional view depicting a first spin valve sensor structure 92 of the present invention. The spin valve sensor structure 92 includes a three part seed layer including an $Al_2O_3$ sublayer 76, followed by an NiMnO sublayer 80, followed by an Si sublayer 94, and a spin valve layer structure is then fabricated on top of the three part seed layer. As with the prior art seed layer depicted in FIG. 3, the three part seed layer of the present invention depicted in FIG. 4 is fabricated in a vacuum system with multiple chambers where the three layers are sequentially deposited without exposure to atmosphere. A comparison of the spin valve sensor 92 of FIG. 4 with that of FIG. 3 reveals the differences that the prior art 35 Å Ta seed sublayer portion 84 of FIG. 3 has been replaced with a 20 Å Si seed sublayer 94, and the PtMn layer thickness has been reduced from approximately 150 Å to approximately 120 Å. A comparison of the properties of the spin valve sensors depicted in FIGS. 3 and 4 is presented hereinbelow. A second preferred embodiment of the spin valve sensor of the present invention can now be described with the aid of FIG. 5.

FIG. 5 is a side cross-sectional view depicting a second embodiment of a spin valve sensor 96 of the present invention. The spin valve sensor 96 includes a three part seed layer, including an $Al_2O_3$ sublayer 76, an NiMnO sublayer 80 and an Si sublayer 98. A comparison of the spin valve sensor 96 of FIG. 5 with that of FIG. 4 reveals that the Si seed sublayer 98 of FIG. 5 has the same approximately 20 Å thickness as the Si seed sublayer 94 of FIG. 4. However, as is discussed herebelow, the performance parameters of the spin valve sensor of FIG. 5 are improved over those of the spin valve sensor of FIGS. 3 and 4. This performance improvement is due to a different fabrication process for the Si seed sublayer 98 of the spin valve sensor 96 depicted in FIG. 5. Specifically, whereas the Si seed sublayer 94 of the spin valve of FIG. 4 was deposited to a thickness of 20 Å, the Si seed sublayer 98 of the spin valve sensor of FIG. 5 was deposited to a thickness of approximately 30 Å and then etched back approximately 10 Å to a final thickness approximately of 20 Å. Thereafter, the 120 Å PtMn layer and subsequent sensor layers, as shown in FIG. 4 are fabricated on top of the etched back Si seed sublayer 98 of FIG. 5. The three part seed layer of spin valve sensor 96 is preferably fabricated in a vacuum system with multiple chambers, wherein the three parts 76, 80 and 98 of the seed layer are sequentially deposited by utilizing three sequential sputtering sources without exposure to atmosphere, followed by an ion beam etching step to etch back the Si sublayer 98. It is therefore to be understood that the single fabrication difference between the spin valve sensors depicted in FIGS. 4 and 5 is that the 20 Å thick Si seed sublayer 98 of FIG. 5 has been over deposited and subsequently etched back to a 20 Å thickness, whereas the Si seed sublayer of the spin valve of FIG. 4 was originally deposited to the 20 Å thickness. The etched back upper surface 100 (shown as a roughened line) of the Si seed sublayer 98 has an altered crystallographic surface, as compared to the deposited Si sublayer 94 of FIG. 4. It is believed by the inventor that the improved properties of the spin valve sensor depicted in FIG. 5 result from the alteration of the surface crystallography of the etched Si seed sublayer 98 of FIG. 5, as compared to the deposited (without etch back) Si seed sublayer 94 of the spin valve sensor depicted in FIG. 4. The altered crystallography of the surface 100 then results in improved crystallography of the PtMn and further layers that are sequentially deposited on top of the surface 100.

For ease of comparison, the structures and performance characteristics of the three spin valve sensors depicted in FIGS. 3, 4 and 5, are presented in Table I.

TABLE I

| | | FIG. 3 | FIG. 4 | FIG. 5 |
|---|---|---|---|---|
| Sensor Layers | Ta | 40 Å | 40 Å | 40 Å |
| | Cu | 5 | 5 | 5 |
| | NiFe | 30 | 30 | 30 |
| | CoFe | 15 | 15 | 15 |
| | Cu | 20 | 20 | 20 |
| | CoFe | 26 | 26 | 26 |
| | Ru | 8 | 8 | 8 |
| | CoFe | 17 | 17 | 17 |
| | PtMn | 150 | 120 | 120 |
| Seed Layer | Etch | W & W/O | — | 10 |
| | Ta | 35 | — | — |
| | Si | — | 20 | 20 |
| | NiMnO | 30 | 30 | 30 |
| | $Al_2O_3$ | 30 | 30 | 30 |
| PERFORMANCE CHARACTERISTICS | $\Delta R/R$ (%) | 8.6 | 8.4 | 8.8 |
| | Hc | 6.5 | 7.0 | 5.5 |
| | Hf | −5 | −3 | −10 |

As can be seen in Table I, each of the spin valve sensors depicted in FIGS. 3, 4 and 5 is represented in a data column.

The specific indication (W&W/O) regarding etching of the Ta seed layer of the embodiment depicted in FIG. 3 means that experimental data was developed for devices wherein the Ta seed layer was etched and was not etched (that is, with and without surface etching). The experimental data results were that the performance characteristics were similar, meaning that the performance of the Ta seed layer spin valve sensor 50 was not appreciably enhanced by etching the surface of the Ta seed layer.

In comparing the performance characteristics of the sensors depicted in FIGS. 3 and 4, it is seen that ΔR/R is slightly decreased, and the coercivity Hc of the FIG. 4 disk is somewhat reduced. The reduction of coercivity is approximately 2 Oersted which can be of significance in some applications. Regarding the etched back Si seed layer sensor 96 of FIG. 5, it has a ΔR/R showing an approximately 5% increase, and a $H_c$ coercivity that shows a 1 Oersted decrease and an $H_f$ coercivity that shows a 5 Oersted decrease from the FIG. 3 sensor. Thus, it is seen that the spin valve sensor 92 of FIG. 4 provides some improvement over the prior art, while the sensor embodiment depicted in FIG. 5 possesses improved performance characteristics due to the depositing and subsequent etching back of its Si seed sublayer. Specifically, the 20 Å Si seed sublayer 94 of the FIG. 4 sensor 92 lacks some of the improved performance characteristics of the etched back 20 Å Si seed sublayer 98 of the sensor 96 depicted in FIG. 5.

With regard to preferred ranges for the deposited Si seed sublayer thickness and preferred ranges for etching back the Si seed sublayer, it appears that the improvements in performance characteristics of the present invention can be obtained where the Si seed sublayer 98 is initially deposited from approximately 15 Å to approximately 45 Å, and the etching back of the Si seed sublayer is conducted from approximately 5 Å to approximately 15 Å. A final thickness range of the Si seed sublayer 98 is from approximately 10 Å to approximately 40 Å. A preferred final thickness range of the Si seed sublayer 98 is from approximately 15 Å to approximately 35 Å, and a preferred final thickness of the Si seed sublayer 98 is approximately 20 Å. Thus the Si seed sublayer 98 described in Table I was initially a 30 Å Si seed layer that was etched back 10 Å to a final thickness of 20 Å.

Figure 6:
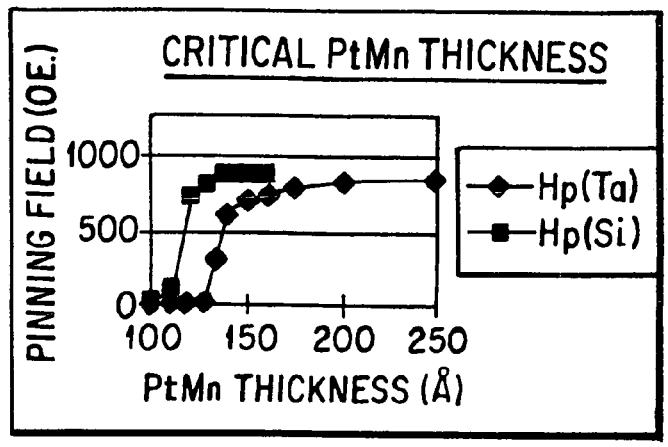
FIG. 6 is a graph comparing the performance characteristics of the Si seed sublayer magnetic head of the present invention with a prior art Ta seed sublayer magnetic head.

As indicated above, the magnetic head of the present invention includes an Si seed sublayer having a reduced thickness together with a PtMn layer having a reduced thickness, which together provide improved performance characteristics to the magnetic head. It is believed that the improved characteristics relate to an improvement in the microstructure of the PtMn layer which forms an enhanced FCT crystal structure phase during the magnetic head annealing process that is conducted to obtain the desired magnetic field direction and pinning as is known to those skilled in the art. FIG. 6 is a graphical depiction comparing the exchange pinning field of magnetic heads as a function of the PtMn layer thickness. The graph compares the Hp pinning field of the Si seed sublayer head of the present invention with the prior art Ta seed sublayer head, depicted in FIG. 3 and described hereabove. It can be seen that the Si seed sublayer head of the present invention maintains a strong pinning magnetic field utilizing a decreased thickness PtMn layer as compared with the prior art head.

Figure 7:
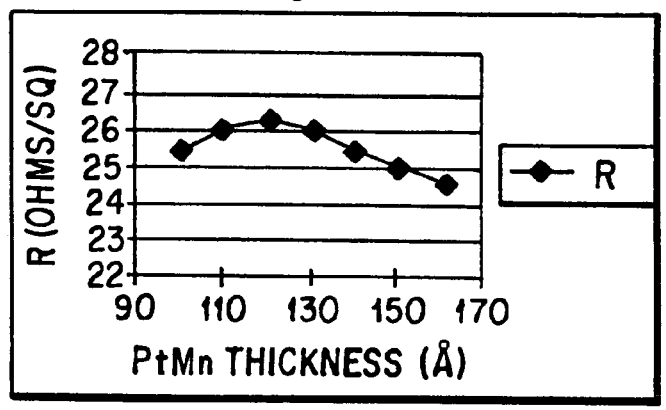
FIGS. 7, 8 and 9 are graphs providing performance data of the Si seed sublayer magnetic head of the present invention.
Figure 8:
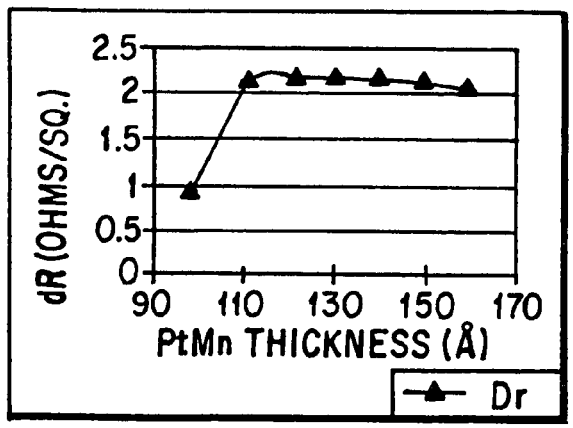
Figure 9:
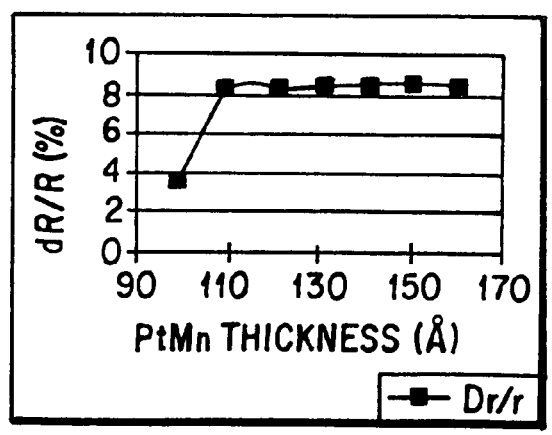

FIGS. 7, 8 and 9 are graphical depictions of performance characteristics of the Si seed sublayer magnetic head of the present invention. As can be seen in FIG. 7, the sensor maintains its resistance R with the PtMn layer thickness decreasing even below 110 Å. As depicted in FIG. 8, the value of ΔR maintains a relatively constant value where the PtMn layer thickness is decreased down to 110 Å. Likewise, as depicted in FIG. 9, the value ΔR/R of the magnetic head of the present invention retains a fairly constant value where the thickness of the PtMn layer is decreased down to approximately 110 Å.

The Si seed layer 94 is expected to provide increased performance results for different types of spin valve layer structures, as are known to those skilled in the art that include a PtMn antiferromagnetic layer, such as a dual antiparallel pinned layer spin valve, in which two PtMn layers are used.

While the present invention has been shown and described with regard to certain preferred embodiments, it is to be understood that those skilled in the art will no doubt develop certain alterations and modifications in form and detail therein. It is therefore intended that the following claims cover all such alterations and modifications that nevertheless include the true spirit and scope of the present invention.

What we claim is:

1. A method for fabricating a magnetic head including a spin valve sensor, comprising the steps of:
    fabricating a first electrical insulation layer (G1) above a first magnetic shield layer (S1);
    fabricating a plurality of spin valve sensor layers above said G1 layer, said spin valve sensor layers including a seed layer, a PtMn antiferromagnetic layer, at least one pinned magnetic layer and at least one free magnetic layer;
    wherein said seed layer includes seed sublayers including $Al_2O_3$, NiMnO and Si; and wherein said PtMn antiferromagnetic layer is fabricated directly upon said Si sublayer.

2. A method for fabricating a magnetic head as described in claim 1 wherein said Si seed sublayer is fabricated to have a thickness of approximately 10 to 40 Å.

3. A method for fabricating a magnetic head as described in claim 1 wherein said Si seed sublayer is fabricated to have a thickness of approximately 20 Å.

4. A method for fabricating a magnetic head as described in claim 2 wherein said PtMn layer has a thickness of approximately 120 Å.

5. A method for fabricating a magnetic head as described in claim 1 wherein said Si seed sublayer is fabricated to have a thickness of approximately 20 Å and said PtMn layer has a thickness of approximately 120 Å.

6. A method for fabricating a magnetic head as described in claim 5 wherein said at least one pinned magnetic layer has a composition including CoFe and said at least one spacer layer has a composition including Cu, and said at least one free magnetic layer has a composition including Co or CoFe.

7. A method for fabricating a magnetic head as described in claim 1 including the further step of etching a surface of said Si sublayer prior to a deposition of said PtMn layer thereon.

8. A method for fabricating a magnetic head including a spin valve sensor, comprising the steps of:
    fabricating a first electrical insulation layer (G1) above a first magnetic shield layer (S1);
    fabricating a plurality of spin valve sensor layers above said G1 layer, said spin valve sensor layers including a seed layer, a PtMn antiferromagnetic layer, at least one pinned magnetic layer and at least one free magnetic layer;

wherein said seed layer is comprised of $Al_2O_3$, NiMnO, Si sublayers, and wherein said Si sublayer is fabricated by depositing Si to a first thickness and subsequently etching said Si to a reduced thickness before the fabrication of said PtMn layer.

9. A method for fabricating a magnetic head as described in claim 8 wherein said Si sublayer is fabricated to have a final thickness of from approximately 10 Å to approximately 40 Å.

10. A method for fabricating a magnetic head as described in claim 9 wherein said Si sublayer is fabricated to have a final thickness of approximately 20 Å.

11. A method for fabricating a magnetic head as described in claim 9 wherein said Si seed sublayer is fabricated to have a thickness of approximately 20 Å and said PtMn layer has a thickness of approximately 120 Å.

12. A method for fabricating a magnetic head as described in claim 11 wherein said spin valve sensor layers include at least one pinned magnetic layer having a composition including CoFe and at least one spacer layer having a composition including Cu, and at least one free magnetic layer having a composition including Co or CoFe.

13. A method for fabricating a magnetic head as described in claim 8, wherein said PtMn layer is fabricated upon said Si sublayer.

* * * * *